(12) United States Patent
Sandberg et al.

(10) Patent No.: US 7,591,644 B2
(45) Date of Patent: Sep. 22, 2009

(54) COUNTER-BALANCED MOLD PLATE FOR FOOD PATTY MOLDING MACHINE

(75) Inventors: Glenn Sandberg, New Lenox, IL (US); Scott A. Lindee, Mokena, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 11/900,923

(22) Filed: Sep. 13, 2007

(65) Prior Publication Data

US 2008/0089971 A1 Apr. 17, 2008

Related U.S. Application Data

(60) Provisional application No. 60/844,789, filed on Sep. 15, 2006.

(51) Int. Cl.
*A22C 7/00* (2006.01)

(52) U.S. Cl. .................. 425/572; 425/574; 426/513

(58) Field of Classification Search ................ 425/556, 425/572, 574; 264/328.8, 328.12; 426/512, 426/513; *A22C 7/00*
See application file for complete search history.

(56) References Cited

U.S. PATENT DOCUMENTS

| 3,887,964 | A | 6/1975 | Richards et al. |
|---|---|---|---|
| 3,952,478 | A | 4/1976 | Richards et al. |
| 4,054,967 | A | 10/1977 | Sandberg et al. |
| 4,182,003 | A | 1/1980 | Lamartino et al. |
| 4,329,828 | A | 5/1982 | Wagner |
| 4,356,595 | A | 11/1982 | Sandberg et al. |
| 4,372,008 | A | 2/1983 | Sandberg |
| 4,418,446 | A * | 12/1983 | Sandberg et al. ............ 425/574 |
| 4,541,143 | A | 9/1985 | Holly |
| 4,608,731 | A | 9/1986 | Holly |
| 4,821,376 | A | 4/1989 | Sandberg |
| 4,872,241 | A | 10/1989 | Lindee |
| 6,416,314 | B1 | 7/2002 | LaBruno |
| 6,428,303 | B2 | 8/2002 | Lindee et al. |
| 6,749,421 | B2 | 6/2004 | Sandberg |
| 7,125,245 | B2 | 10/2006 | Hansen et al. |
| 7,255,554 | B2 | 8/2007 | Lamartino et al. |
| 2002/0160089 | A1 * | 10/2002 | Cowart ....................... 426/512 |
| 2005/0042321 | A1 * | 2/2005 | LaBruno et al. ............. 425/408 |

* cited by examiner

*Primary Examiner*—Maria Veronica D Ewald
(74) *Attorney, Agent, or Firm*—Erickson Law Group, PC (57) ABSTRACT

A mold plate for use in a reciprocating mold plate patty-forming apparatus includes a flat body having a plurality of cavities for forming patties. The flat body has a fill side face and an opposite face. A grid pattern of grooves is formed on the second face extending longitudinally and laterally on the second face. The pattern extends a lateral distance that is about equivalent to an overall patty cavity field width. Longitudinal and lateral slots that penetrate though a thickness of the mold plate and flow connect fill side pressure and meat with the pattern of grooves on the second face to balance the pressure on the opposite faces of the flat body.

20 Claims, 6 Drawing Sheets

COUNTER-BALANCED MOLD PLATE FOR FOOD PATTY MOLDING MACHINE

This application claims the benefit of U.S. Provisional Application 60/844,789 filed Sep. 15, 2006.

BACKGROUND OF THE INVENTION

Food patties of various kinds, including hamburgers, molded "steaks", fish cakes, chicken patties, pork patties, potato patties, and others, are frequently formed in high-volume automated molding machines. Patty molding machines that can be successfully adapted to any of these food products are described in U.S. Pat. Nos. 3,887,964; 4,329,828; 3,952,478; 4,054,967; 4,182,003; 4,608,731; 4,541,143; and PCT published applications WO 99/62344, WO 2005/027666 A3 and WO 2005/027667A3 or as FORMAX® F-6, F-12, F-19, F-26, F-400 or MAXUM700® reciprocating mold plate forming machine, available from Formax, Inc. of Mokena, Ill., U.S.A.

In a typical food patty molding machine, such as disclosed in U.S. Pat. No. 3,887,964, food material is pumped into mold cavities of a reciprocating mold plate that slides between a fill position and a discharge position. The mold plate slides between a support plate or fill plate and a breather plate. The fill plate includes a fill slot which is arranged to communicate the pressurized material into the mold cavities when the mold plate is in the fill position. The breather plate includes breather orifices and an air discharge channel and functions to relieve air from the mold cavities as the food material is pressurized into the mold cavities.

An apparatus for molding food patties that have essentially uniform texture and minimal shrinkage when cooked is disclosed in U.S. Pat. No. 4,356,595. The patties also hold their shape consistently after cooking. The apparatus includes a multi-orifice plate interposed in the outlet end of a fill passage extending from a food pump to a cyclically reciprocating mold plate. The food pump is preferably controlled so that the maximum fill pressure, desirable for consistent filling of the mold cavities, is used for only a limited part of each mold plate cycle.

U.S. Pat. No. 4,372,008 also discloses a multi-orifice fill plate and uses a stripper plate slidably mounted immediately adjacent the fill plate. The stripper plate has fill openings that align one-for-one with the fill plate orifices when the stripper plate is in a fill location. Once the mold cavities are filled, the stripper plate slides transversely of the direction of mold plate movement to cut food fibers along the fill side face of the fill plate.

U.S. Pat. No. 4,821,376 describes a food patty molding machine that comprises a multi-orifice fill plate, interposed in the fill passage immediately adjacent the mold plate and a stripper plate. The stripper plate has a multiplicity of fill openings aligned one-for-one with the fill orifices as extensions thereof when the stripper plate is in its fill location. The spacings between fill openings in the stripper plate, in the direction of the stripper plate path, are such that movement of the stripper plate to its discharge location seals off the fill orifices.

The multi-orifice tooling is commercially available from Formax, Inc. of Mokena, Ill., U.S.A under the trademark TENDER-FORM®.

For both a slot fill plate and a multi-orifice fill plate, the mold plate reciprocates between a fill plate and a breather plate within a close fitting sliding tolerance. Typical "running clearances" between a reciprocating mold plate and the stationary fill plate and stationary breather plate is 0.001 to 0.003 inches The interface between the fill plate and the mold plate is lubricated by the food material pressurized into the mold cavities which is exposed to the fill plate surface as the mold plate moves longitudinally over the fill plate. The interface between the breather plate and a mold plate is lubricated by longitudinally arranged through-slots that extend through a thickness of the mold plate and are exposed to the pressurized food material from the fill slot during at least a portion of the reciprocating cycle of the mold plate. Laterally arranged depressions or grooves on the surface of the mold plate facing the breather plate are in communication with the longitudinal through-slots and serve to distribute the pressurized food material across the width of the mold plate. This food material is exposed to the breather plate and lubricates this interface as the mold plate longitudinally slides against the breather plate.

However, the filling pressure of product against the fill side of the mold plate can reduce the running clearance opposite the filling side, the clearance between the mold plate and the breather plate, to 0.000 inch clearance. This lack of clearance removes any room for the lubricating characteristics of food such as meat to keep the metal mold plate from rubbing the metal breather plate, and can cause galling between the mold plate and the breather plate, increased wear on the mold plate and breather plate, increased driving power requirements due to increased friction between the mold plate and the breather plate, and increased leakage due to the increase clearance between the mold plate and the fill plate.

The present inventors have recognized that the longitudinal through-slots are less effective to deliver food material to the interface between the mold plate and the breather plate when using a multi-orifice fill plate because of the limited flow area of the limited number of orifices that are aligned to pass by the longitudinally arranged through-slots.

The present inventors have recognized that it would be desirable to provide a mold plate that was configured to supply an increased amount of pressurized food material to the interface between the breather plate and the mold plate for a machine that supplied food material through a multi-orifice filler plate.

The present inventors have recognized that it would be desirable to provide a mold plate that was configured to have a sufficient food material flow area between the fill plate and the breather plate through a thickness of the mold plate for both a slot fill plate and a multi-orifice fill plate.

SUMMARY OF THE INVENTION

This present invention is an improvement to a forming machine mold plate and to a forming machine having a mold plate that reciprocates between a fill plate and a breather plate.

The invention relates to "floating" or "counterbalancing" a reciprocating mold plate that will reduce the force required to move the mold plate, reduce the possibility of galling between the running surfaces or interface between the mold plate and the breather plate, and reduce product leakage that occurs due to running clearances associated with reciprocating mold plate machines.

The present invention mold plate "floats" the mold plate or keeps product between these running surfaces. Food product under fill pressure effectively reaches the opposite side of the mold plate and distributes this pressure (meat) onto, across and between the running surfaces.

The mold plate of the present invention advantageously accommodates both types of fill techniques:

1. Slot fill. Typically a slot that is about 3/8 to 1/2" in width that extends across the entire mold plate.
2. Multi-orifice fill. Typically holes about 1/4" in diameter that are closely spaced throughout a 6"×entire mold plate width. In the case of a MAXUM700® machine commercially available from Formax, Inc. of Mokena, Ill., U.S.A., that would be 6" front to back×700 mm side to side; approximately 970 holes.

In the case of a slot fill operation, the counterbalancing can use fill pressure and residual pressure that remains in the pumping chamber after fill is turned off.

In the case of multi-orifice fill with a seal-off stripper, the residual pressure that remains in the numerous orifices can be effectively used for this counterbalance operation.

The mold plate of the preferred embodiment of the present invention comprises lateral through-slots advantageous for multi-orifice filling operations. The lateral through-slots go through the mold plate and collect or scrape off the residual meat that is under pressure from the orifices to provide lubrication to the top side of the mold plate. These lateral through-slots extend laterally across the mold plate to collect as much pressure (meat) as possible from the multitude of small orifices. The lateral through-slots are in communication with at least one lateral groove on a side of the mold plate that faces the breather plate to distribute the pressure (meat) uniformly between the mold plate and the breather plate. Preferably, the at least one lateral groove comprises a groove grid that includes a plurality of lateral grooves intersected by a plurality of longitudinal grooves.

As a further aspect of the invention, the preferred embodiment of the present invention can also include provisions for the slot fill technique. In this way, the mold plate can be a universal part that can be used for either a multi-orifice fill technique or a slot fill technique.

According to this embodiment, a plurality of spaced-apart longitudinal through-slots are also provided. The longitudinal through-slots run front to back to collect the meat under residual pressure from the fill slot of the fill plate. The longitudinal length of the through-slots ensures sufficient exposure time with the laterally extended fill slot during reciprocation of the mold plate. The longitudinal through-slots are in communication with at least one lateral groove on the side of the mold plate that faces the breather plate to distribute the pressure (meat) uniformly between the mold plate and the breather plate. Preferably, the at least one lateral groove comprises the aforementioned groove grid that includes the plurality of lateral grooves intersected by the plurality of longitudinal grooves.

The mold plate configuration of the invention should reduce the galling between the mold plate and the breather plate, reduce the mold plate drive current (force) and reduce meat leakage. The mold plate configuration of the invention should achieve a counterbalance of forces between the breather plate and the fill plate and an even "split" of the available clearance of 0.001 to 0.003 inches, between each side of the mold plate.

Numerous other advantages and features of the present invention will be become readily apparent from the following detailed description of the invention and the embodiments thereof, and from the accompanying drawings.

DESCRIPTION OF THE PREFERRED EMBODIMENT

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
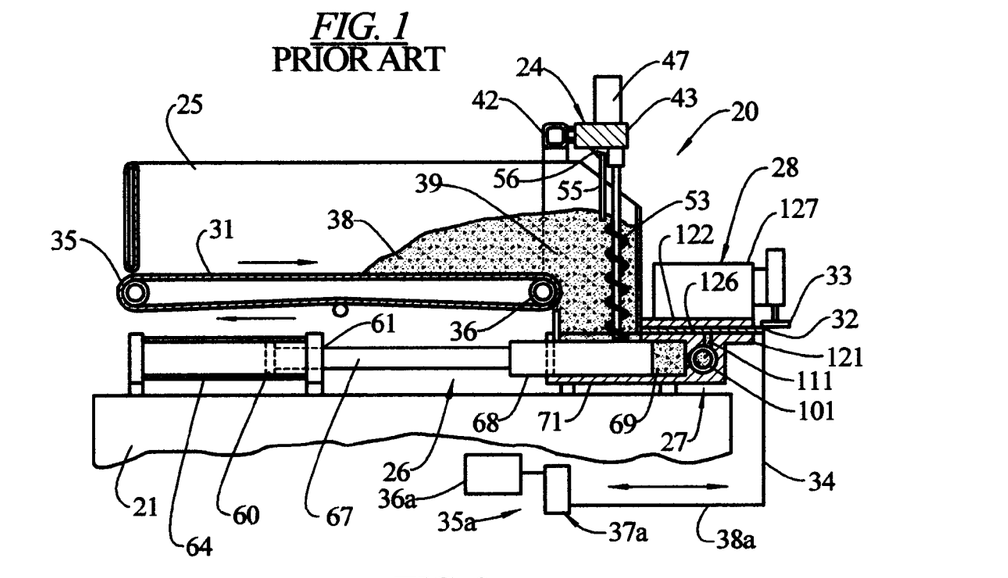
FIG. 1 is a sectional elevation view of the molding mechanism of a food patty molding machine of one type to which the present invention can be applied, specifically the molding machine of Richards U.S. Pat. No. 3,887,964.

FIG. 1 illustrates a high volume food patty molding machine 20 of the type described in detail in U.S. Pat. No. 3,887,964. The food patty-forming apparatus can be generally configured as disclosed in any of U.S. Pat. Nos. 3,887,964, 4,329,828; 3,952,478; 4,054,967; 4,182,003; 4,608,731; 4,541,143; or PCT published applications WO 99/62344, WO 2005/027666 A3 and WO 2005/027667A3, all incorporated by reference or as a FORMAX® F-6, F-12, F-19, F-26, F-400 or MAXUM700® reciprocating mold plate forming machine, available from Formax, Inc. of Mokena, Ill., U.S.A.

Molding machine 20 includes a machine base 21 which supports the operating mechanisms of the machine and contains hydraulic actuating systems, electrical actuating systems, and most of the machine controls.

The food patty molding machine 20 includes a supply means 24 for storing and supplying a moldable food product, such as ground beef, fish, pork, chicken, potatoes, or the like, to the processing mechanisms of the machine. Supply means 24 includes a large food product storage hopper 25 that supplies a food pump system 26. System 26 includes two food pumps (one shown) operating in alternation. The two food pumps continuously pump food, under pressure, into a valve manifold connected to a cyclically operable molding station 28. Molding station 28 includes a multi-cavity mold plate 32 that moves cyclically between a fill position, shown in FIG. 1 and a discharge position (FIG. 2) in which its mold cavities are outside of station 28, aligned with a set of knock-out cups 33.

Figure 2:
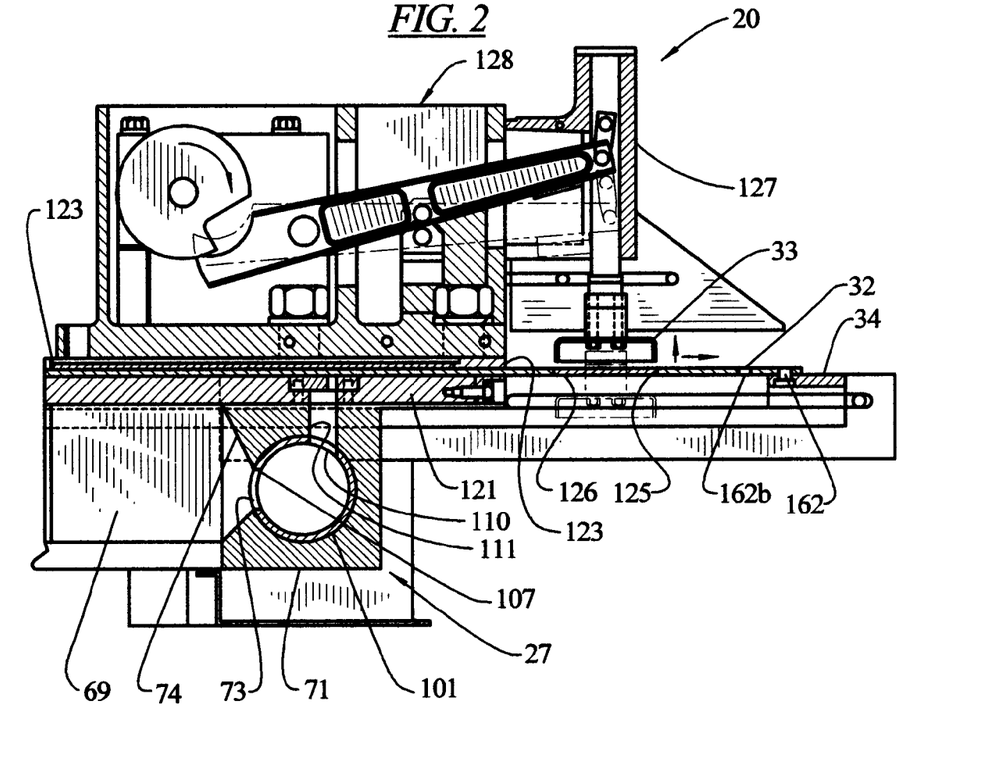
FIG. 2 is a sectional view of the food patty molding machine of the invention with a mold plate in a knock out position.

The mold plate is reciprocally driven by a motor arrangement 35a (shown schematically) in a timed, controlled cycle. The motor arrangement can be a servomotor 36a that drives a cam or crank arrangement 37a that drives parallel drive rods 38a that are connected together by a transverse drive bar 34 (FIG. 2). The mold plate 32 can be fastened to the drive bar 34 to be reciprocated thereby.

The motor arrangement 35a is not described in detail herein but is described in detail in WO 2005/027666 A3 and WO 2005/027667A3, both incorporated by reference. A detailed description of different types of motor arrangements can be found in U.S. Pat. Nos. 3,887,964, 4,329,828; 3,952,478; 4,054,967; 4,182,003; 4,608,731; 4,541,143; or PCT published applications WO 99/62344, all incorporated by reference.

Food supply means 24 includes a conveyor belt 31 that extends completely across the bottom of hopper 25, around a tensioning roller 35 and a drive roller 36. In FIG. 1, a limited supply of food product 38 is shown in hopper 25; a much greater supply could be stored in the hopper without exceeding its capacity. The forward end of hopper 25 communicates with a vertical hopper outlet 39 that leads downwardly into two pump chambers; only one pump chamber 69 is shown. A frame 42 mounted on machine base 21 extends over the top of hopper 25, above the hopper outlet 39, and a bracket 43 affixed to frame 42 supports a plurality of motors that drive a plurality of vertical feed screws. Only one motor 47 and one feed screw 53 are shown in FIG. 1.

A level sensing mechanism at the outlet end of hopper 25 comprises a sensing element 55 affixed to a shaft 56 that extends downwardly into the forward end of hopper 25. As food product moves forwardly in the hopper, it may accumulate to a level at which it engages sensor 55. When this occurs, shaft 56 is rotated and actuates a limit switch (not shown) to interrupt the drive for conveyor roller 36. This makes it possible to maintain the accumulation of food product at a safe level at the outlet end 39 of food hopper 25.

In machine 20, as noted above, the food pump system 26 comprises two reciprocating food pumps; only one pump 61 is illustrated. Food pump 61 includes a hydraulic cylinder 64. The piston 60 in cylinder 64 is connected to a piston rod 67 in turn connected to a large pump plunger 68. Plunger 68 is aligned with and extends into pump cavity 69, which is enclosed by a housing 71. The forward wall 74 of pump cavity 69 includes a slot 73 that communicates the pump manifold 27 as shown in the enlarged view of FIG. 2.

Pump feed manifold 27 includes a valve cylinder 101 fitted into an opening in housing 71 immediately beyond wall 74. Valve cylinder 101, as shown in FIG. 2, includes two intake slots; only one intake slot 107 is illustrated. Slot 107 is alignable with the outlet slot 73 in pump cavity wall 74, and this is the position employed when pump 61 (FIG. 1) is in use. Rotation of cylinder 101 is effective to move slot 107 out of alignment with slot 73 when the other pump of machine 20 is in operation. Valve cylinder 101 also includes an elongated outlet slot 110 aligned with a slot 111 (FIG. 2) in housing 71 that comprises a fill passage for the molding mechanism of station 28.

As seen in FIG. 1, the upper part of the pump housing 71 comprises a plate 121 that supports a mold plate 32. Mold plate 32 includes a plurality of individual mold cavities 126 distributed across the width of the mold plate; mold cavities 126 are alignable with the manifold outlet, fill passage 111, as shown in FIG. 1. A mold cover 122 is disposed immediately above mold plate 32, closing off the top of each of the mold cavities 126. Mold cover 122 includes a breather plate 123; see FIG. 2. Suitable spacers (not shown) are provided to maintain the spacing between breather plate 123 and support plate 121 essentially equal to thickness of mold plate 32. A housing 127 is positioned above cover plate 122, FIG. 1. Housing 127 encloses the knock out operating mechanism 128 (FIG. 2) for the knock-out cups 33.

In the operation of patty molding machine 20, a supply of ground meat or other moldable food product 38 is put into hopper 25, and is advanced toward hopper outlet 39 by conveyor 31. Whenever one of the food pump plungers, such as plunger 68, is retracted to expose a pump cavity (e.g., cavity 69), the vertical feed screws 53 aligned with that pump cavity are actuated to feed the food product into the pump cavity.

In FIG. 1 pumping system 26 is illustrated with mold plate 32 in its fill position and with pump 61 pumping the moldable food product through manifold 27. The second food pump of the machine, at this time, may be receiving a supply of the food product for a subsequent pumping operation. Pump 61, as shown, has just begun its pumping stroke, and has compressed the food product in pump cavity 69, forcing it under pressure into manifold 27. As operation of machine 20 continues, plunger 68 advances and food product under pressure flows into mold cavities 126.

In describing the operation of molding mechanism 28, and particularly mold plate 32, it is convenient to start with mold plate 32 in the fill position shown in FIG. 1. In each molding cycle, mold plate 32 remains in this fill position for a limited dwell interval. As the mold cavities 126 move into the fill position, one of the two food pumps of machine 20 pumps food product through manifold 27 and fill passage 111, filling the mold cavities 126. To assure complete filling of the mold cavities, the food pump must apply a substantial pressure to the food product. In machine 20 the fill pressure on the food product may be well over one hundred pounds per square inch, subject to variation in accordance with the requirements of the food product being molded into patties, the sizes of the mold plate cavities 126, and other related factors. In other machines, different fill pressures may be required.

Following the fill dwell interval, mold plate 32 is moved outwardly, to the right from its fill position, as shown in FIG. 1, until it reaches a discharge position with its mold cavities 126 aligned with knockout cups 33 (FIG. 2). As mold plate 32 moves toward its discharge position, mold cavities 126 all move clear of fill passage 111 before any part of those cavities projects out of mold station 28, beyond support plate 121 and cover 122. Thus, the food pump in machine 20, as shown in FIG. 1, remains sealed off at all times. A second dwell interval occurs at the discharge position of mold plate 32, during which knockout cups 33 move downwardly through the mold cavities, discharging the molded food patties 125 onto a take-off conveyor (not shown).

Following discharge of the molded food patties, mold plate 32 is moved back toward its fill position so that mold cavities 126 can again be filled with food product. Again, mold cavities 126 are completely inside molding mechanism 28, sealed off, before they come into alignment with fill passage 111.

The knock out apparatus 128 is mounted above the breather plate 34. The knockout apparatus 128 is not described in detail. A detailed description of different types of knock out apparatus can be found in U.S. Pat. Nos. 3,887,964, 4,329,828; 3,952,478; 4,054,967; 4,182,003; 4,608,731; 4,541,143; or PCT published applications WO 99/62344, WO 2005/027666 A3 and WO 2005/027667A3, all incorporated herein by reference. The knock out apparatus 128 causes the knock out cups 33 to reciprocate vertically according to a timed, controlled cycle. The knock out cups 33 are adapted to register with the mold cavities 126 in the mold plate 32. Food patties 140, formed in the mold cavities 126, as described below, are thereby pushed from the cavities to be deposited below the mold plate and/or conveyed to a remote location.

Figure 3:
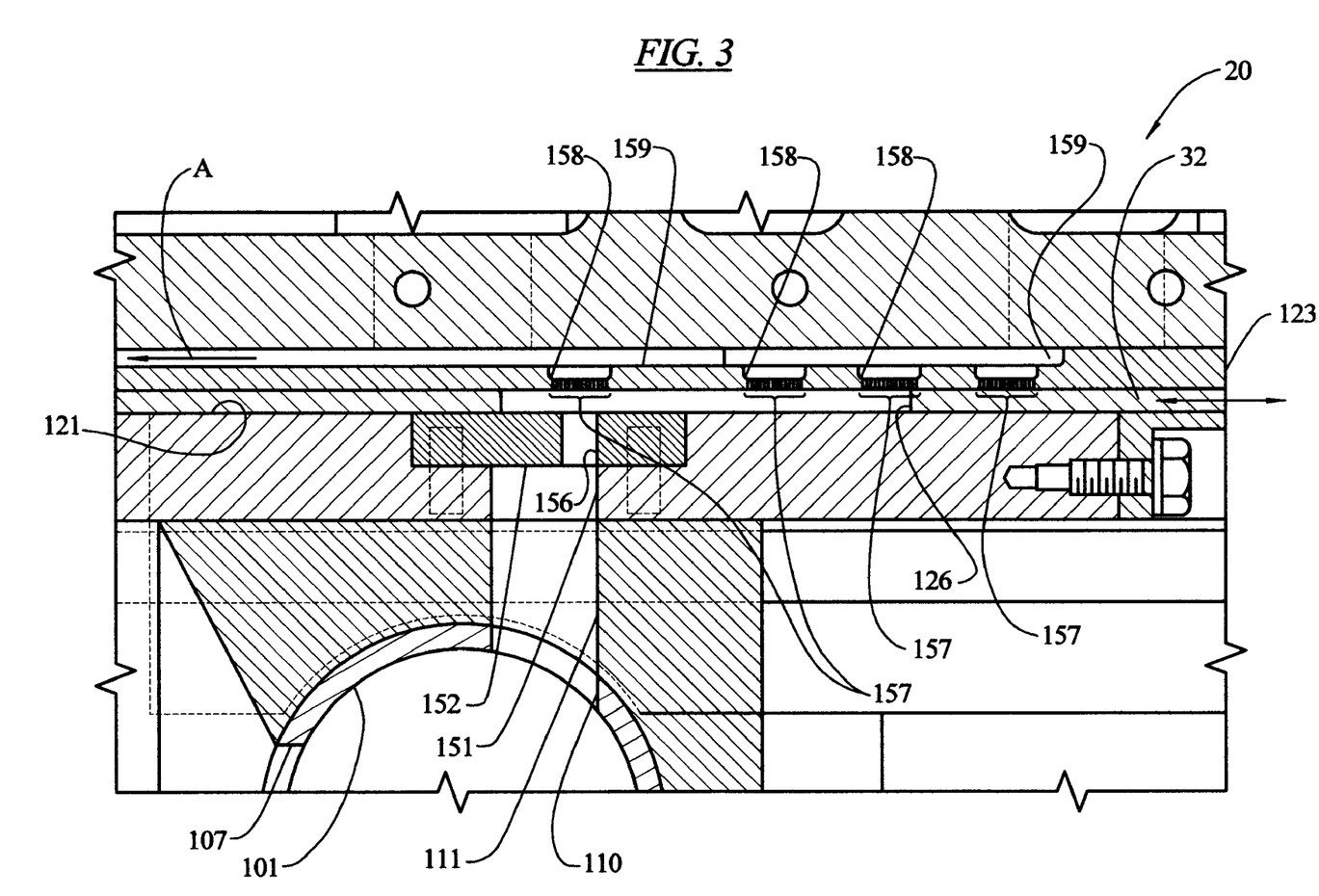
FIG. 3 is an enlarged sectional view of the food patty molding machine of FIG. 2 with the mold plate in a filling position.

FIG. 3 illustrates the machine 20 of FIG. 2 with the mold plate 32 retracted (to the left) to a cavity filling position. In this position, the cavities 126 are located above the cavity fill passage 111 of the food product filling apparatus 27. Food product 39 is pumped by the plunger 68, through the cylinder 69, and into the tube valve 101. The tube valve 101 is used to switch between the cylinder 69 and an alternate cylinder (not shown) for switching food product supply. Food product 39 passes from the fill passage 111 into a delivery slot 151 of the support plate 121. The delivery slot 151 is partly closed by a fill slot insert plate 152 fastened to the support plate 121 which defines the fill slot 156.

The breather plate 123 includes breather orifices 157 that open into breather depressions 158 that are open into breather channels 159 that lead back to the hopper flowing in the direction A. A more detailed description of breather plates can be found in U.S. Pat. No. 6,416,314 or PCT published applications WO 99/62344, WO 2005/027666 A3 and WO 2005/027667A3, all herein incorporated by reference.

Figure 4:
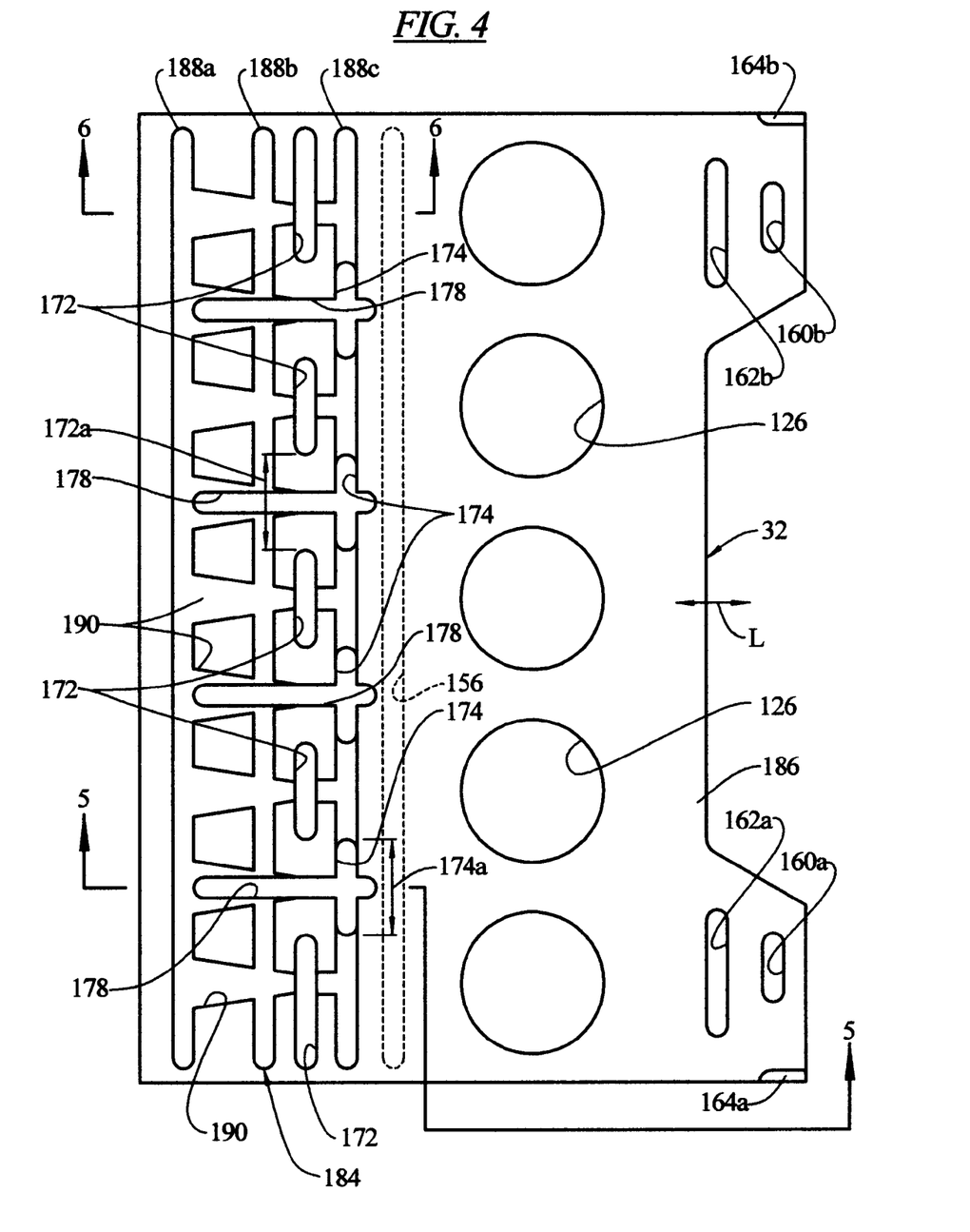
FIG. 4 is a plan view of a mold plate taken from FIG. 3 with a superimposed location of the fill slot of the patty-molding machine.
Figure 5:
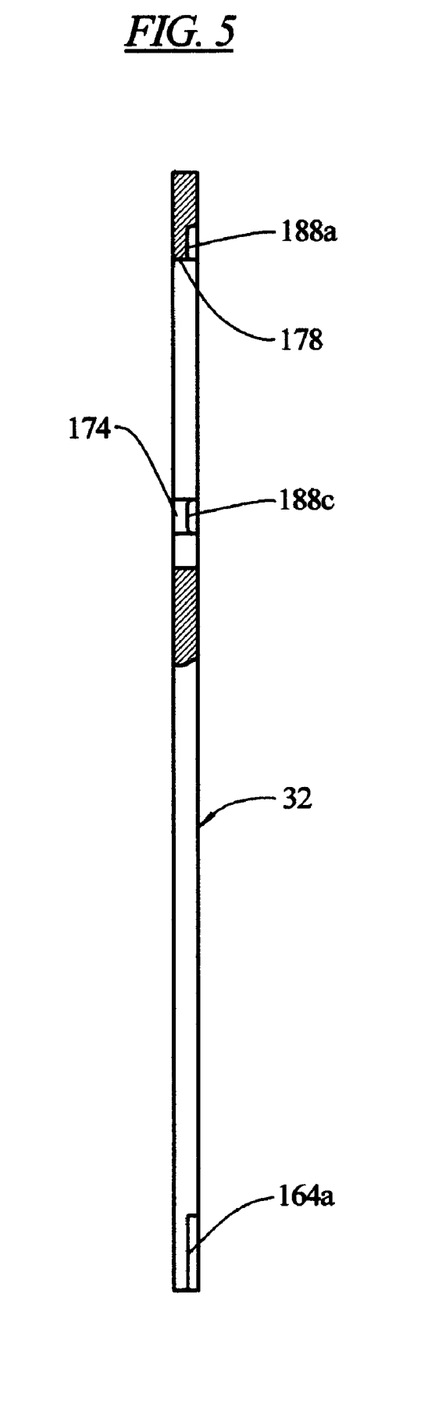
FIG. 5 is a sectional view taken generally along line 5-5 of FIG. 4.
Figure 6:
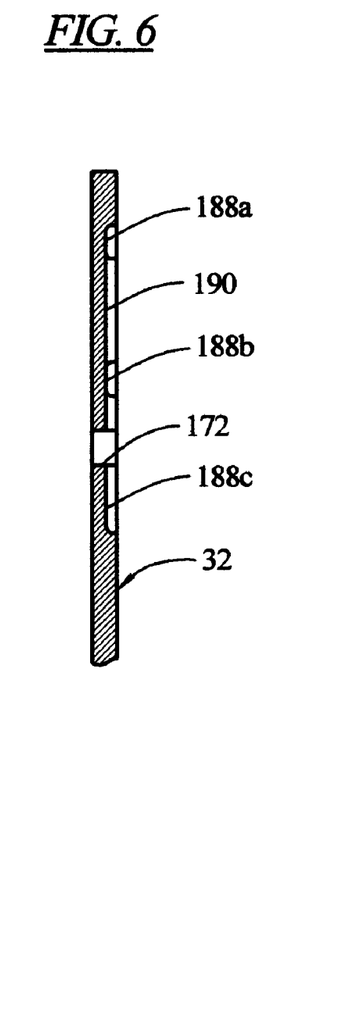
FIG. 6 is a sectional view taken generally along line 6-6 of FIG. 4.

FIGS. 4-6 illustrate the mold plate 32 in more detail. A top side of the mold plate 32 is shown. At a front end of the mold plate 32, oblong key slots 160a, 160b are located at each side. The key slots 160a, 160b are fitted with oblong keys 162 (FIG. 2) to fix the mold plate to the drive bar 34 (FIG. 2). Oblong drain slots 162a, 162b are arranged inboard of the key slots 160a, 160b. The drain slots 162a, 162b allow any materials or fluid collected on top of the plate 32 to drain into a collection area (not shown) on the machine 20. Corner recesses 164a, 164b are provided outside of the key slots 160a, 160b. The corner recesses 164a, 164b receive a hold down finger or clamp device (not shown) that is carried by the drive bar 34 (FIG. 2) to retain the mold plate down on the drive bar.

At a trailing end of the mold plate 32 a first line of spaced-apart transverse through-slots 172 extends across the plate 32. A second line of spaced-apart transverse through-slots 174 is arranged longitudinally spaced from the first line of transverse though-slots 172. The transverse through-slots 174 are aligned with transverse gaps 172a between the through-slots 172. The through-slots 174 have a transverse length 174a that equals the transverse gap 172a between the through-slots 172.

A plurality of transversely spaced-apart, longitudinal through-slots 178 are formed with each transverse through-slot 174, forming a "t" shape therewith.

A groove grid 184 is formed into a surface 186 of the mold plate 32 that faces the breather plate 123. The groove grid 184 includes three transverse grooves 188a, 188b, 188c and nine longitudinal grooves 190. The longitudinal grooves 190 have a flared shape toward the trailing end of the mold plate 32 to reduce flow resistance longitudinally through the grooves 190. The longitudinal grooves 190 connect the transverse grooves 188a, 188b, 188c. The through-slots 172 are in flow communication with the groove grid 184 via a first set of alternate grooves 190. The through-slots 174 are in flow communication with the groove grid 184 via the grooves 188c. The through-slots 178 are in flow communication with the groove grid 184 via a second set of alternate grooves 190.

Food product passing through or pressurizing the slot 172, 174, 178 moves through, or pressurizes, the groove grid 184 to spread food product or food product pressure evenly over a transverse extent of the mold plate 32, and a longitudinal extent, at least of the groove grid 184.

The fill slot 156 of the fill plate 152 is superimposed on the view of the mold plate 32 shown in FIG. 4. It is to be understood that the fill slot 156 would be below the mold plate 32 as shown in FIG. 4 and that the mold plate 32 moves longitudinally in a direction of arrow L with respect to the fill slot 156.

When the mold plate moves longitudinally over the fill slot 156, food material passes through the slots 172, 174, 178. Because the longitudinal slots 178 are exposed to the fill slot 156 for a greater time during movement of the mold plate 32, the slots 178 are believed to be more effective than the lateral slots 172, 174 at receiving food product or pressure from food product.

As the mold plate 32 reciprocates against the breather plate 123 the food product, particularly meat, lubricates the interface between the breather plate 123 and mold plate 32, and by food product pressure, maintains a running clearance between the mold plate 32 and the breather plate 123. It is believed that the through-slots and the groove grid 184 provide sufficient area to ensure that the running clearance between the breather plate and the mold plate is substantially equal to the running clearance between the mold plate 32 and the support plate 121.

As described in U.S. Pat. Nos. 4,356,595 and 4,372,008, herein incorporated by reference, the quality of molded food patties can be improved by relieving the pressure on the food product in the pump cavity and in the fill passage throughout a substantial portion of the molding cycle. Specifically, quality of the molded food patties may be materially improved if the pressure is relieved substantially during the time interval in which the mold plate is moving away from its fill position but a part of the mold cavity remains in communication with the fill passage.

Given that the duration of pressurized food product from the fill slot may be time limited during the mold plate cycle, the mold plate of the present invention provides sufficient flow area and slot and groove shapes, positions and orientations to achieve this counter-balancing of the mold plate.

Figure 7:
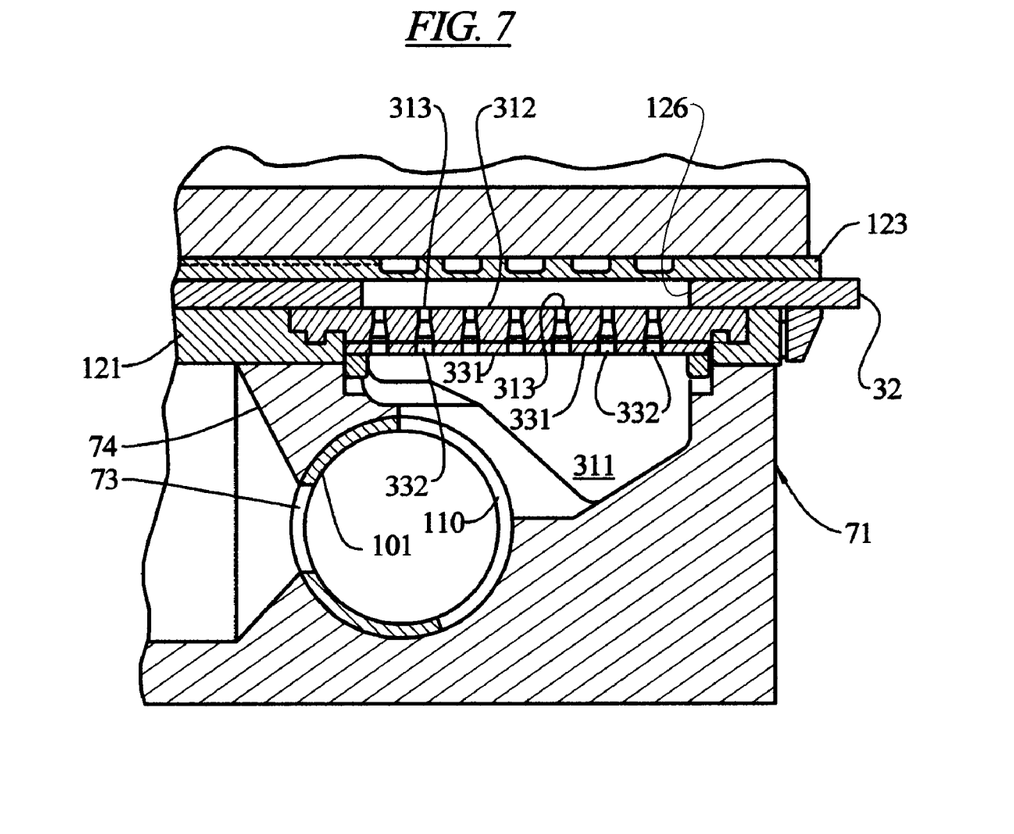
FIG. 7 is a sectional view, like FIG. 1, illustrating a modification of the machine of FIG. 1 as in Sandberg U.S. Pat. No. 4,821,376, with a stripper plate in a fill position.

FIG. 7 illustrates a modification of the patty molding machine 20 as described in detail in U.S. Pat. No. 4,821,376, herein incorporated by reference. The size of the fill passage 311 of the molding mechanism is increased, as compared with the fill slot 111 in the construction shown in FIGS. 1-3. Fill passage 311 encompasses substantially the entire surface area of all of the mold cavities 126. A fill plate 312 is interposed in the outlet end of fill passage 311, immediately adjacent mold plate 32. A multiplicity of fill orifices 313 are distributed, preferably in staggered rows, throughout substantially the entire surface area of fill plate 312. By way of example, each orifice may have an outlet diameter of about 0.25 inch (6.35 mm) with an inlet diameter of about 0.31 inch (7.87 mm), or that relation may be reversed. Straight, untapered holes may also be used. In a typical construction, the angle of taper may be of the order of twenty degrees, but substantial variation is acceptable. The orifices can also be as described in U.S. patent application Ser. No. 11/408,248, filed Apr. 20, 2006 and herein incorporated by reference.

A stripper plate 331 is slidably mounted in fill passage 311 immediately adjacent the side of fill plate 312 opposite mold plate 32, as shown in FIG. 7. In fact, stripper plate 331 is disposed in surface-to-surface contact with orifice plate 312. Stripper plate 331 includes a multiplicity of fill openings 332 distributed throughout substantially its entire surface area and aligned one-for-one with fill orifices 313, so that each fill orifice 313 is an extension of one fill opening 332 when stripper plate 331 is in its fill position as shown in FIG. 7. Fill orifices 313 and fill openings 332 may be aligned in parallel rows with equal center-to-center spaces between the orifices (and fill openings) in the direction of the orifice rows.

Figure 8:
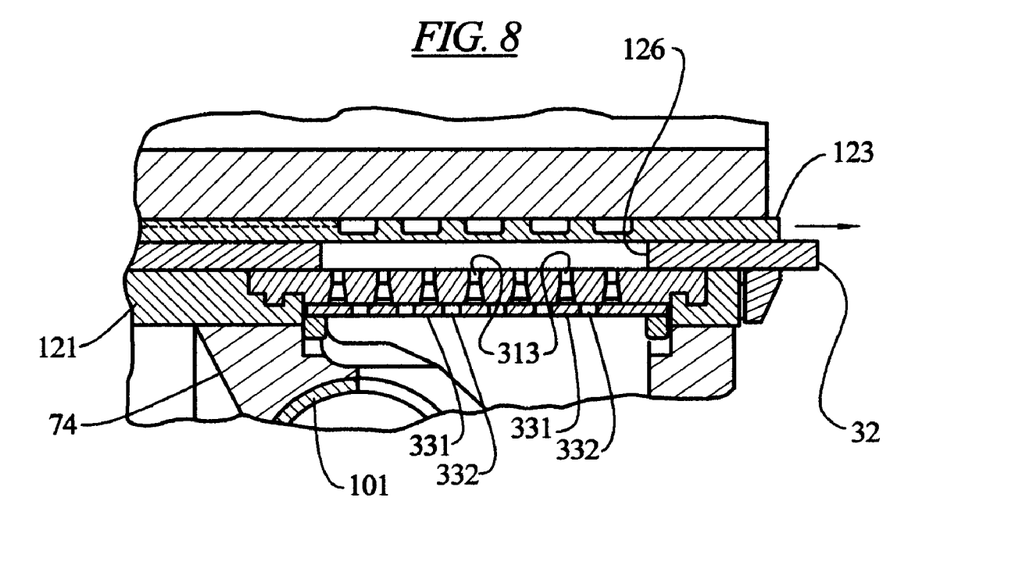
FIG. 8 is a sectional view like FIG. 7 but with the stripper plate in a seal off position.

FIG. 8 shows the stripper plate 331 at the end of a discharge position wherein the stripper plate has been moved to block or seal off the fill orifices 313.

Figure 9:
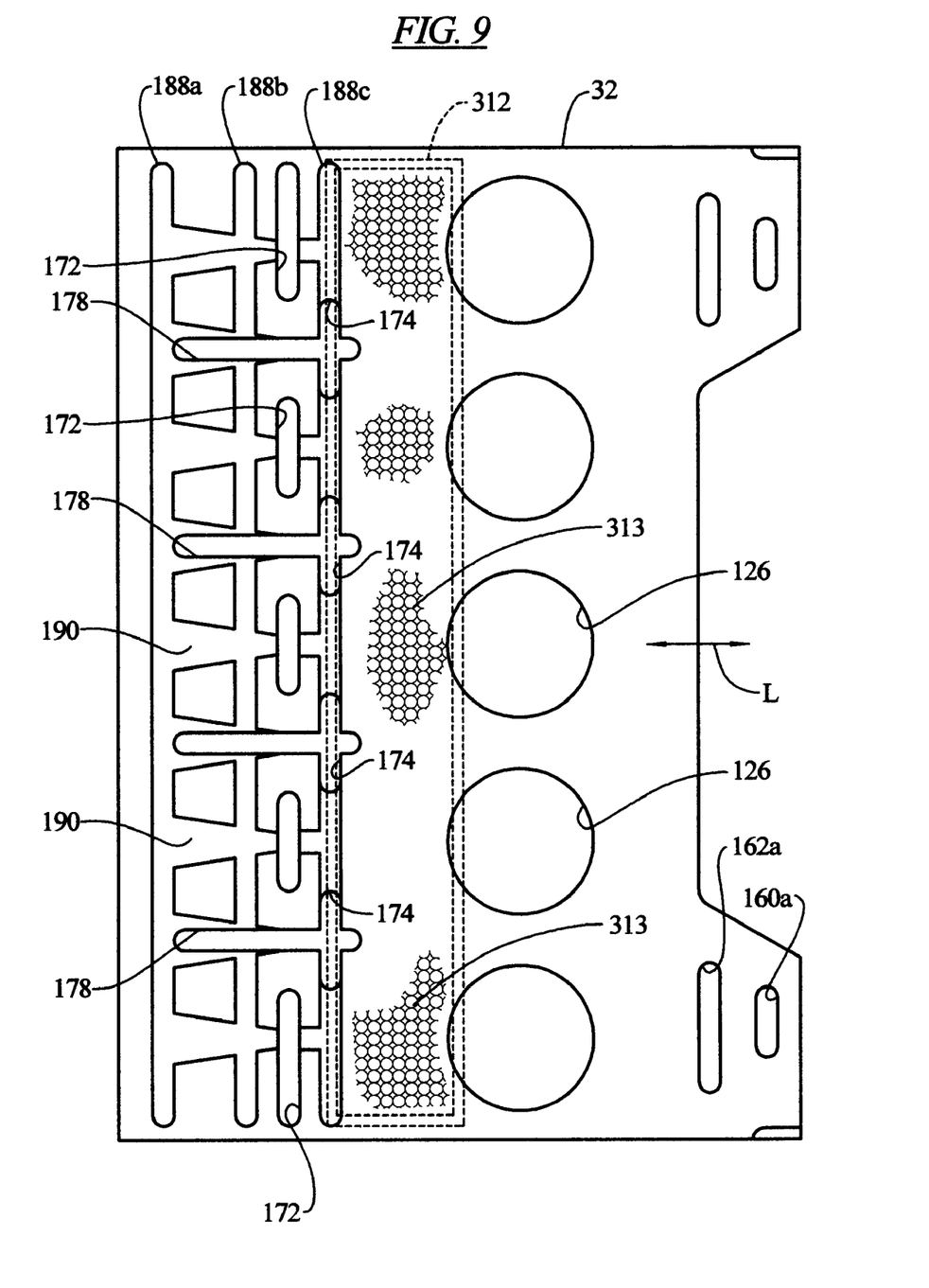
FIG. 9 is a plan view of a mold plate taken from FIG. 7 with a superimposed location of the fill orifices of the patty-molding machine.

FIG. 9 illustrates the same mold plate as shown in FIGS. 4-6 except with the fill plate 312 of FIGS. 7 and 8 shown superimposed on the mold plate 32. It is to be understood that the fill plate 312 would be below the mold plate 32 as shown in FIG. 9 and that the mold plate 32 moves longitudinally in a direction of arrow L with respect to the fill plate 312.

When the mold plate 32 moves longitudinally over the orifices 313, food material from the orifices 313 passes through the slots 172, 174, 178. Because the lateral slots 172, 174 are exposed to a greater number of orifices 313 during movement of the mold plate 32, the slots 172, 174 are believed to be more effective than the longitudinal slots 178 at receiving food product or pressure from food product.

Food product passing through or pressurizing the slot 172, 174, 178 moves through, or pressurizes, the grid 184 to spread food product or food product pressure evenly over a transverse extent of the mold plate 32, and a longitudinal extent, at least of the groove grid 184.

As the mold plate 32 reciprocates against the breather plate 123 the food product, particularly meat, lubricates the interface between the breather plate 123 and mold plate 32, and by food product pressure, maintains a running clearance between the mold plate 32 and the breather plate 123. It is believed that the through-slots and the groove grid 184 provide sufficient area to ensure that the running clearance between the breather plate of the mold plate is substantially equal to the running clearance between the mold plate 32 and the support plate 121.

As described in U.S. Pat. Nos. 4,356,595 and 4,372,008, herein incorporated by reference, the quality of molded food patties can be improved by relieving the pressure on the food product in the pump cavity and in the fill passage throughout a substantial portion of the molding cycle. Specifically, quality of the molded food patties may be materially improved if the pressure is relieved substantially during the time interval in which the mold plate is moving away from its fill position but a part of the mold cavity remains in communication with the fill passage.

Given that the duration of pressurized food product from the fill slot may be time limited during the mold plate cycle, the mold plate of the present invention provides sufficient flow area and slot and groove shapes, positions and orientations to achieve this counter-balancing of the mold plate.

Although in the illustrated embodiments, the support plate 121 is located below the mold plate 32, and the breather plate 123 is located above the mold plate 32, such is not a required orientation. In some cases, for example, the breather plate, functioning also as a support plate, can be located below the mold plate and a fill plate can be located above the mold plate. The mold plate reciprocally slides between the fill plate and the breather plate. This orientation of plates is also encompassed by the invention.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A mold plate for use in a reciprocating mold plate patty-forming apparatus wherein said mold plate reciprocates in a longitudinal direction, comprising:
   a flat body configured to reciprocate longitudinally, having a front end that leads the body during a forward movement of the longitudinal reciprocation,
   a plurality of cavities for forming patties, said flat body having a first face and an opposite, second face, a plurality of lateral grooves on said second face, and
   at least one lateral slot that penetrates through a thickness of said body from said first face to said second face, said lateral slots being in flow communication with said lateral grooves, said lateral slot is orientated laterally in relation to the longitudinal reciprocating direction of the mold plate.

2. The mold plate according to claim 1, further comprising a plurality of longitudinal slots in flow communication with said lateral grooves.

3. The mold plate according to claim 1, further comprising a plurality of longitudinal slots in flow communication with said lateral grooves, wherein each of said longitudinal slots is open to at least one of said lateral slots.

4. The mold plate according to claim 1, further comprising a plurality of longitudinal slots in flow communication with said lateral grooves, wherein said at least one lateral slot comprises a plurality of laterally spaced apart slots, wherein each of said longitudinal slots is open to at least one of said lateral slots, and further comprising a plurality of longitudinal grooves on said second face and arranged spaced-apart and in flow communication with said plurality of lateral grooves.

5. The mold plate according to claim 4, wherein said longitudinal grooves have expanding end regions.

6. The mold plate according to claim 4, wherein each of said longitudinal slots is open to at least one of said longitudinal grooves.

7. The mold plate according to claim 4, wherein said lateral slots are arranged in two longitudinally spaced apart rows with slots in a first row of said two longitudinally spaced apart rows being offset from slots in a second row of said two longitudinally spaced apart rows.

8. The mold plate according to claim 1, wherein said at least one lateral slot comprises a plurality of lateral slots, wherein said lateral slots are arranged in two longitudinally spaced apart rows of laterally spaced apart lateral slots with slots in a first row of said two longitudinally spaced apart rows being offset from slots in a second row of two said longitudinally spaced apart rows.

9. The mold plate according to claim 1, wherein said plurality of lateral grooves are arranged in longitudinally spaced apart rows on said second face, wherein said at least one lateral slot comprises a plurality of laterally spaced apart slots, and said plurality of lateral slots are arranged in two longitudinally spaced apart rows with lateral slots in a first row of said two longitudinally spaced apart rows being offset from lateral slots in a second row of said two longitudinally spaced apart rows, a length of a gap between adjacent lateral slots of the first row of said two longitudinally spaced apart rows being equal to or less than a length of a lateral slot of the second row of said two longitudinally spaced apart rows that is longitudinally aligned with said gap.

10. The mold plate for use in a reciprocating mold plate patty-forming apparatus wherein said mold plate reciprocates in a longitudinal direction, comprising:
    a flat body configured to reciprocate longitudinally, having a front end that leads the body during a forward movement of the longitudinal reciprocation, a plurality of cavities for forming patties, said flat body having a first face and an opposite, second face, a plurality of lateral grooves on second face, at least one longitudinal slot that penetrates through a thickness of said body from said first face to said second face, said longitudinal slot being in flow communication with said lateral grooves, a plurality of lateral slots that penetrate through the thickness of said body from said first face to said second face in flow communication with said lateral grooves, said lateral slots are orientated laterally in relation to the longitudinal reciprocating direction of the mold plate.

11. The mold plate according to claim 10, wherein said at least one longitudinal slot comprises a plurality of laterally spaced apart longitudinal slots, wherein each of said longitudinal slots is open to at least one of said lateral slots.

12. The mold plate for use in a reciprocating mold plate patty-forming apparatus wherein said mold plate reciprocates in a longitudinal direction, comprising:

a flat body having, a plurality of cavities for forming patties, said flat body having a first face and an opposite, second face, a plurality of lateral grooves on second face, at least one longitudinal slot that penetrates through a thickness of said body from said first face to said second face, said longitudinal slot being in flow communication with said lateral grooves, and longitudinal grooves on said second face in flow communication with said lateral grooves.

13. The mold plate according to claim 12, wherein said at least one longitudinal slot comprises a plurality of laterally spaced apart longitudinal slots, wherein each of said longitudinal slots is open to at least one of said longitudinal grooves.

14. A mold plate for use in a reciprocating mold plate patty-forming apparatus wherein said mold plate reciprocates in a longitudinal direction, comprising:

a flat body configured to reciprocate longitudinally having a front end that leads the body during a forward movement of the longitudinal reciprocation, a plurality of cavities for forming patties, said flat body having a first face and an opposite, second face, a longitudinal body length and a lateral body width, and an overall patty cavity field width that is equivalent to a width of the portion of the body that is occupied by the said cavities, a pattern of grooves on said second face extending longitudinally and laterally on the second face, said pattern extending a longitudinal distance that is less than said body length and lateral distance that is about equivalent to said overall patty cavity field width, at least one lateral slot that penetrates through a thickness of said mold plate between said first and second faces and at least one longitudinal slot that penetrates through a thickness of said mold plate between said first and second faces, said at least one lateral slot and said at least one longitudinal slot in flow communication with said pattern of grooves on said second face, said lateral slot is orientated laterally in relation to the longitudinal reciprocating direction of the mold plate.

15. The mold plate according to claim 14, wherein said at least one lateral slot comprises a plurality of laterally spaced apart lateral slots and said at least one longitudinal slot comprises a plurality of laterally spaced apart longitudinal slots.

16. The mold plate according to claim 14, wherein said at least one lateral slot comprises a plurality of laterally spaced apart, and longitudinally spaced apart lateral slots and said at least one longitudinal slot comprises a plurality of laterally spaced apart longitudinal slots.

17. The mold plate according to claim 16, wherein said pattern comprises a grid pattern of lateral and longitudinal grooves.

18. The mold plate according to claim 1, wherein said plurality of lateral grooves are arranged on said flat body on a trailing side of said cavities as said flat body moves toward a patty knock out position when the mold plate is operating on a reciprocating mold plate patty-forming apparatus.

19. The mold plate according to claim 10, wherein said plurality of lateral grooves are arranged on said flat body on a trailing side of said cavities as said flat body moves toward a patty knock out position when the mold plate is operating on a reciprocating mold plate patty-forming apparatus.

20. The mold plate according to claim 14, wherein said pattern of grooves is arranged on said flat body on a trailing side of said cavities as said flat body moves toward a patty knock out position when the mold plate is operating on a reciprocating mold plate patty-forming apparatus.

* * * * *